United States Patent
Quick, Jr. et al.

(10) Patent No.: US 7,515,713 B2
(45) Date of Patent: Apr. 7, 2009

(54) SECURE GENERATION OF TEMPORARY MOBILE STATION IDENTIFIERS

(75) Inventors: Roy Franklin Quick, Jr., San Diego, CA (US); Gregory G. Rose, Concord (AU)

(73) Assignee: QUALCOMM Incorporated, San Diego, CA (US)

( * ) Notice: Subject to any disclaimer, the term of this patent is extended or adjusted under 35 U.S.C. 154(b) by 999 days.

(21) Appl. No.: 10/021,874

(22) Filed: Dec. 17, 2001

(65) Prior Publication Data

US 2003/0112976 A1  Jun. 19, 2003

(51) Int. Cl.
*H04Q 7/00* (2006.01)
*H04Q 9/00* (2006.01)

(52) U.S. Cl. .................. 380/248; 380/270; 713/170

(58) Field of Classification Search ............. 455/422.1, 455/433; 708/254; 380/247–250, 270; 713/184, 713/170
See application file for complete search history.

(56) References Cited

U.S. PATENT DOCUMENTS

| | | |
|---|---|---|
| 4,901,307 A | 2/1990 | Gilhousen et al. |
| 5,103,459 A | 4/1992 | Gilhousen et al. |
| 5,123,111 A * | 6/1992 | Delory et al. ............ 455/432.1 |
| 5,375,251 A * | 12/1994 | Pfundstein .................. 455/551 |
| 5,539,921 A * | 7/1996 | Tayloe ........................ 455/13.3 |
| 5,889,861 A * | 3/1999 | Ohashi et al. ............... 380/247 |
| 6,044,069 A * | 3/2000 | Wan .............................. 370/311 |
| 6,225,888 B1 * | 5/2001 | Juopperi ..................... 340/5.8 |
| 6,373,949 B1 * | 4/2002 | Aura ........................... 380/247 |
| 7,222,238 B2 * | 5/2007 | Bleumer et al. ............. 713/177 |

OTHER PUBLICATIONS

Main et al., "Data Structures and Other Objects Using C++", 2001, Addison Wesley, 2nd Edition, pp. 570-571.*
Menezes et al. "Handbook of Applied Cryptography", 1997, CRC Press, pp. 224-225.*

* cited by examiner

*Primary Examiner*—Kambiz Zand
*Assistant Examiner*—William S Powers
(74) *Attorney, Agent, or Firm*—Kent D. Baker; Won Tae C. Kim; Thomas R. Rouse

(57) ABSTRACT

In a disclosed embodiment, a visitor location register first initializes an assignment table to store N entries. Next, the visitor location register waits until a TMSI assignment is needed. Then, a counter is maintained in memory and is incremented. The value of the counter is then hashed to produce an assignment table index. Beginning at the assignment table index, the assignment table is searched for an available entry. The counter is then encrypted to produce a TMSI. The IMSI corresponding to the TMSI assignment is then stored in the assignment table.

45 Claims, 3 Drawing Sheets

SECURE GENERATION OF TEMPORARY MOBILE STATION IDENTIFIERS

BACKGROUND

1. Field

The present invention generally relates to wireless communication systems and more particularly to secure generation of temporary mobile station identifiers.

2. Related Art

In wireless communication systems, such as Global System for Mobile Communication ("GSM"), each mobile station uses an International Mobile Subscriber Identifier ("IMSI") to uniquely identify each user on the network. However, an attacker or eavesdropper may use a mobile station's IMSI to potentially track or eavesdrop on a mobile station user. In order to obscure the identity of the mobile user some systems, such as GSM and the Code Division Multiple Access ("CDMA") Interim Standard 2000 ("IS-2000"), use Temporary Mobile Station Identifier ("TMSI") in lieu of IMSI when operating in a service area.

TMSI provides security by substituting a randomly selected identification number instead of the mobile station's actual IMSI. The TMSI is selected from a large pool of possible identifiers. In GSM and CDMA IS-2000 systems the TMSI value is a thirty two (32) bit number. Thus, for GSM and CDMA the number of possible TMSI that can be assigned is $2^{32}$ or 4,294,967,296.

This number provides a large number of possible TMSI assignments. The security of TMSI is derived from its large space of possible assignments that an eavesdropper must search to find a particular user. However, the total number of assignments is currently too large for current systems to manage as an assignment table in real time. Also, managing such a large table in memory requires a large amount of memory, which adds to manufacturing costs.

Some known methods for managing and assigning TMSI are as follows. One method is to select TMSIs randomly. However, a problem with a random selection is that it is possible that two or more mobile stations have the same randomly-assigned TMSI. If the network assigns about $2^{16}$ TMSI, the probability that an identical assignment was made approaches one.

A second method is to assign TMSIs from a small subset of the total space to speed searches. Although this approach reduces the storage requirements, it also reduces the randomness of the TMSI. This weakens the overall strength of the TMSI protection scheme, since an eavesdropper has a better chance of predicting the next TMSI assignment, based on the current assignment.

A third method is to manage TMSI assignments as a linked list. Using a linked list minimizes the storage required. However, a linked list approach greatly increases the search time to find an entry for a TMSI or to find an unassigned TMSI for a new assignment.

Thus, it is beneficial for a wireless system to be able to practically maintain and generate secure temporary mobile station identifiers. There is therefore a need in the art for methods and systems for efficiently maintaining and securely generating TMSI assignments.

SUMMARY

Embodiments disclosed herein address the above stated needs by using an encryption module to securely generate a TMSI and storing the corresponding IMSI in an assignment table, which holds N entries, where N is determined based on the maximum number of expected users U, supported by a service area.

The presently disclosed embodiments are directed to methods and systems for efficiently maintaining and securely generating TMSI assignments. According to one aspect of the present invention, a visitor location register first initializes an assignment table to store N entries. Next, the visitor location register waits until a TMSI assignment is needed. Then, a counter is maintained in memory and is incremented. The value of the counter is then hashed to produce an assignment table index. Beginning at the assignment table index, the assignment table is searched for an available entry. The counter is then encrypted to produce a TMSI. The IMSI corresponding to the TMSI assignment is then stored in the assignment table.

DETAILED DESCRIPTION

The presently disclosed embodiments are directed to methods and systems for efficiently maintaining and securely generating TMSI assignments. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Figure 1:
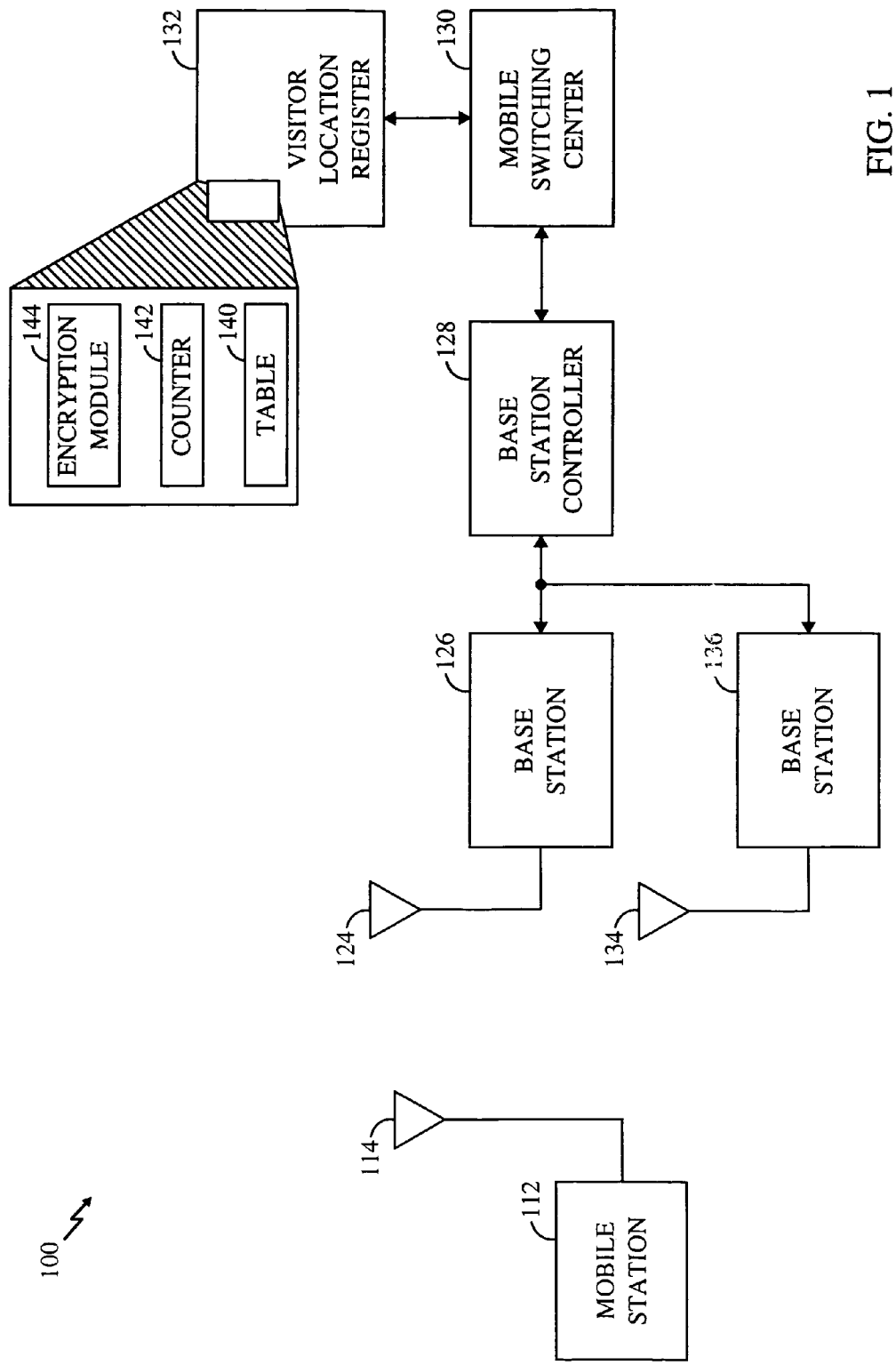
FIG. 1 illustrates an exemplary service area in a wireless communication system according to an embodiment of the present invention.

FIG. 1 illustrates exemplary service area 100 operating in a wireless communications system, wherein service area 100 uses a temporary identifier, such as TMSI, to provide user identity confidentiality. Service area 100 may be any system using temporary identifiers, such as a GSM communication system or a CDMA communication system.

By way of example, the present embodiment of the invention operates in a CDMA communication system. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in a "high data rate" communication systems, disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

Service area 100, generally may contain many users, each operating a mobile station, such as mobile station 112. Mobile station 112, for example. may be a cellular phone or a wireless modem. Mobile station 112 transmits a radio frequency ("RF") signal by way of antenna 114 to a base station, such as base station 126 or 136. Base station 126 receives the RF signal transmitted from mobile station 112 by way of antenna 124. Similarly, base station 136 receives the RF signal transmitted from mobile station 112 by way of antenna 134. Base station 126 and base station 136 are controlled by base station controller 128. Base station controller 128 operates with mobile switching center 130, which acts as a switching node for service area 100. Also, mobile switching center 130 provides the functionality for setting up a call, such as registration, authentication, location update, and call routing for mobile station 112.

Mobile switching center 130 coordinates with visitor location register ("VLR") 132 and home location register ("HLR") to provide call-routing and roaming capabilities for mobile station 112; the HLR is not shown in FIG. 1. As part of call-routing and roaming, VLR 132 provides a TMSI assignment for mobile station 112 as it begins operating in service area 100. When a TMSI assignment is granted for mobile station 112, VLR 132 maintains an entry in assignment table 140 that stores the IMSI value of mobile station 112. In maintaining assignment table 140, VLR 132 also uses counter 142 and encryption module 144, which are discussed in further detail in FIG. 2.

Figure 2:
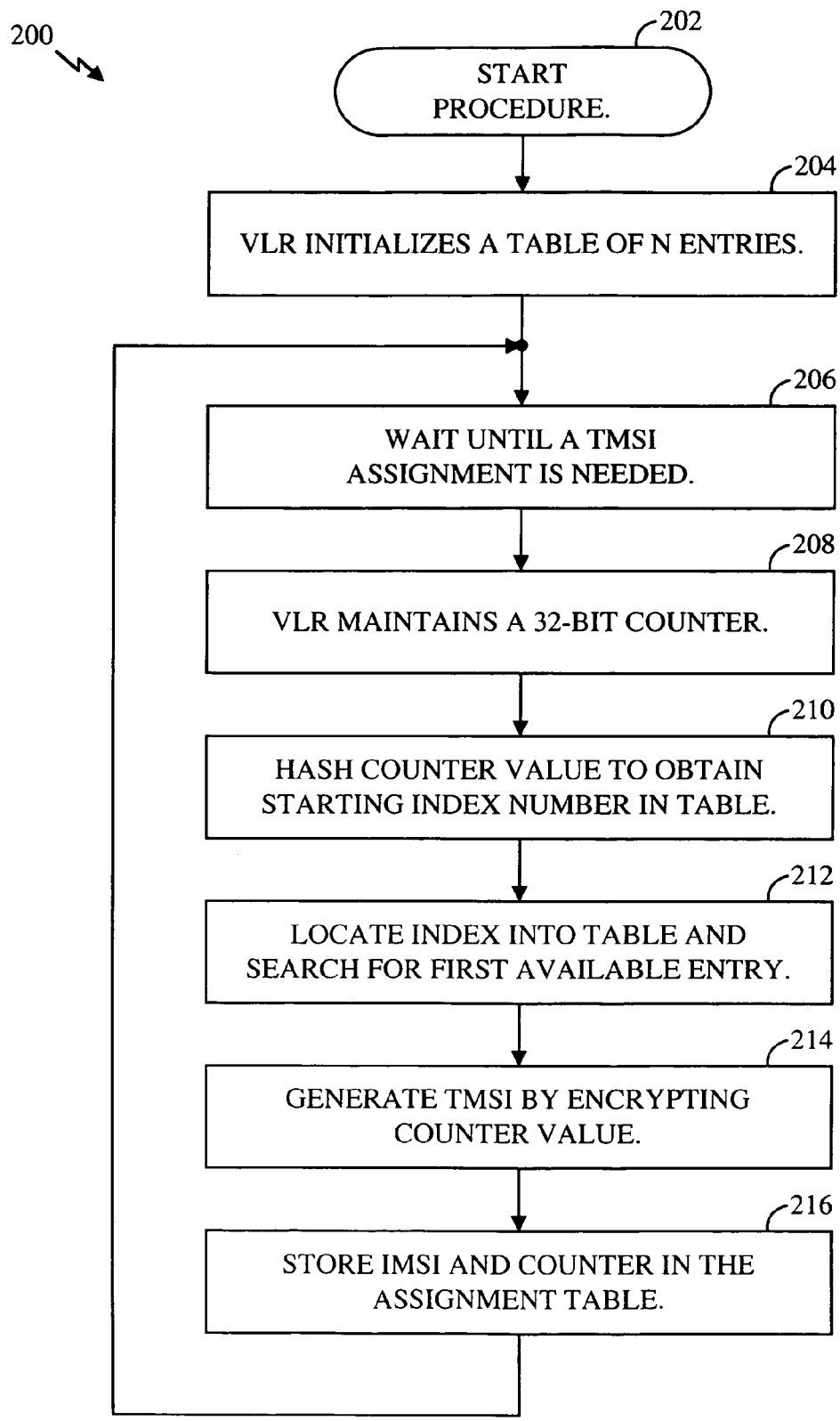
FIG. 2 illustrates an exemplary procedure for generating and maintaining temporary mobile station identifiers according to an embodiment of the present invention.

FIG. 2 illustrates procedure 200, which is used for the generation and management of temporary identifiers, such as TMSI for mobile stations. In general, procedure 200 resides in a visitor location register, such as VLR 132. Procedure 200 begins in step 202. In step 204, VLR 132 initializes assignment table 140 to hold N entries, wherein service area 100 supports U users. The number of entries N is chosen such that N>U, because the system efficiency degrades significantly as the number of utilized entries approaches the size of the hash table, i.e. as U approaches N. An exemplary general rule, corresponding to a particular efficiency level, states that the hash table should be approximately two-thirds full, i.e. $N \geq 1.5U$. See, for example, "The Art of Computer Programming," Vol. 3, by Donald E. Knuth, published in 1998 by Addison-Wesley Publishing Company, with ISBN number 0-201-89685-0. Assignment table 140 stores a subscriber identifier, such as an IMSI, for each assigned TMSI. VLR 132 uses assignment table 140 to obtain the corresponding IMSI for a TMSI assigned to mobile station 112.

In step 206, VLR 132 waits until a TMSI assignment is needed, such as when mobile station 112 enters a new serving system, wherein each serving sector comprises a VLR.

In step 208, VLR 132 increments counter 142, which is a K-bit counter, where K bits is the same length as the identifier used by the TMSI. Counter 142 is initialized to zero at the time of installation. Before each new TMSI assignment, counter 142 is incremented. In GSM and CDMA, the TMSI is a thirty two (32) bit number, thus counter 142 is configured to be a thirty two (32) bit counter.

In step 210, counter 142 is hashed to obtain an assignment table index. A hash function module generates an assignment table index that ranges from 0 to N−1. A standard hash function can be used, such as those found in "The Art of Computer Programming," Vol. 3, by Donald E. Knuth, published in 1998 by Addison-Wesley Publishing Company, with ISBN number 0-201-89685-0. The hash function module output determines the starting index in assignment table 140, assignment table index.

In step 212, VLR 132 begins searching for an available entry beginning with the entry at "assignment table index." If the entry located at assignment table index has a TMSI assigned to it, then VLR 132 repeats the search at the next entry. For example, if the assignment table index is X, and entry X in the assignment table index has a TMSI assigned to it, then VLR 132 resumes its search at entry X+1 in the assignment table. The search is repeated until an entry that does not have a TMSI assignment is found. To prevent problems when the end of a table is reached, for example, the program should also have a provision such that if $X+1 \geq N$, the search would resume at index=0 in the table.

In step 214, VLR 132 encrypts the value of counter 142, which will be referred to as "counter value" in the present application. The TMSI is generated in step 214 by encryption of the counter value. VLR 132 uses an encryption algorithm with a K-bit block cipher, where again, K is the same length as the identifier used by the TMSI. For example, a CDMA or GSM system would use an encryption algorithm with a 32-bit block cipher. An encryption algorithm provides a one-to-one mapping between the counter value and a corresponding TMSI assignment. Thus, collisions from assigning the same TMSI value are avoided provided that the same counter value is not used concurrently by different TMSI assignments. To provide further security, the ciphering key is known only to VLR 132 to hinder an attacker from correctly identifying the next TMSI that is assigned.

In step 216, after VLR 132 generates a TMSI assignment, VLR 132 stores the IMSI of mobile station 112 and counter value in assignment table 140. After step 216, the procedure continues at step 206 for the next TMSI assignment.

After assignment table 140 is populated with one or more entries using procedure 200, VLR 132 may obtain the corresponding IMSI of an assigned TMSI. When VLR 132 receives a TMSI from mobile station 112, VLR 132 obtains the IMSI of mobile station 112 by first decrypting the TMSI. The decrypted TMSI reveals the counter value of the 32-bit counter. The counter value is then passed to a hash function as in step 210, which produces the assignment table index value corresponding to mobile station 112. Starting from the entry corresponding to the index value, assignment table 140 is searched until a match is found with the counter value. The entry corresponding to the counter value contains the correct IMSI value of mobile station 112.

Generally, VLR 132 stores an additional table, which may be referred to as an IMSI-to-TMSI table, in which the TMSI is stored for each active IMSI. This table can be used, for example, if the network is trying to page a mobile station.

First, the network presents IMSI corresponding to mobile station 112, for example. Then, VLR 132 uses the IMSI-to-TMSI table to obtain the TMSI corresponding to mobile station 112.

Also, the IMSI-to-TMSI table allows an assigned TMSI to be removed if an IMSI registration is cancelled or expired. For example, VLR 132 may receive an order from the network to remove an IMSI registration. Thus, the corresponding TMSI entry must be removed from assignment table 140.

VLR 132 obtains the corresponding TMSI value associated with the IMSI from the IMSI-to-TMSI table. The TMSI is decrypted, which then produces a counter value. The counter value is hashed to reveal an assignment table index. The table is then searched starting from the entry corresponding to the assignment table index. The entry corresponding to the counter value is then removed, thus freeing that TMSI for future use.

Generally, VLR 132 can use a timer to ensure that a TMSI value expires after a certain time. This timer should be sufficiently short so that counter 142, which is thirty two bits in one embodiment, does not wrap around to a value that corresponds to an active TMSI assignment.

Figure 3:
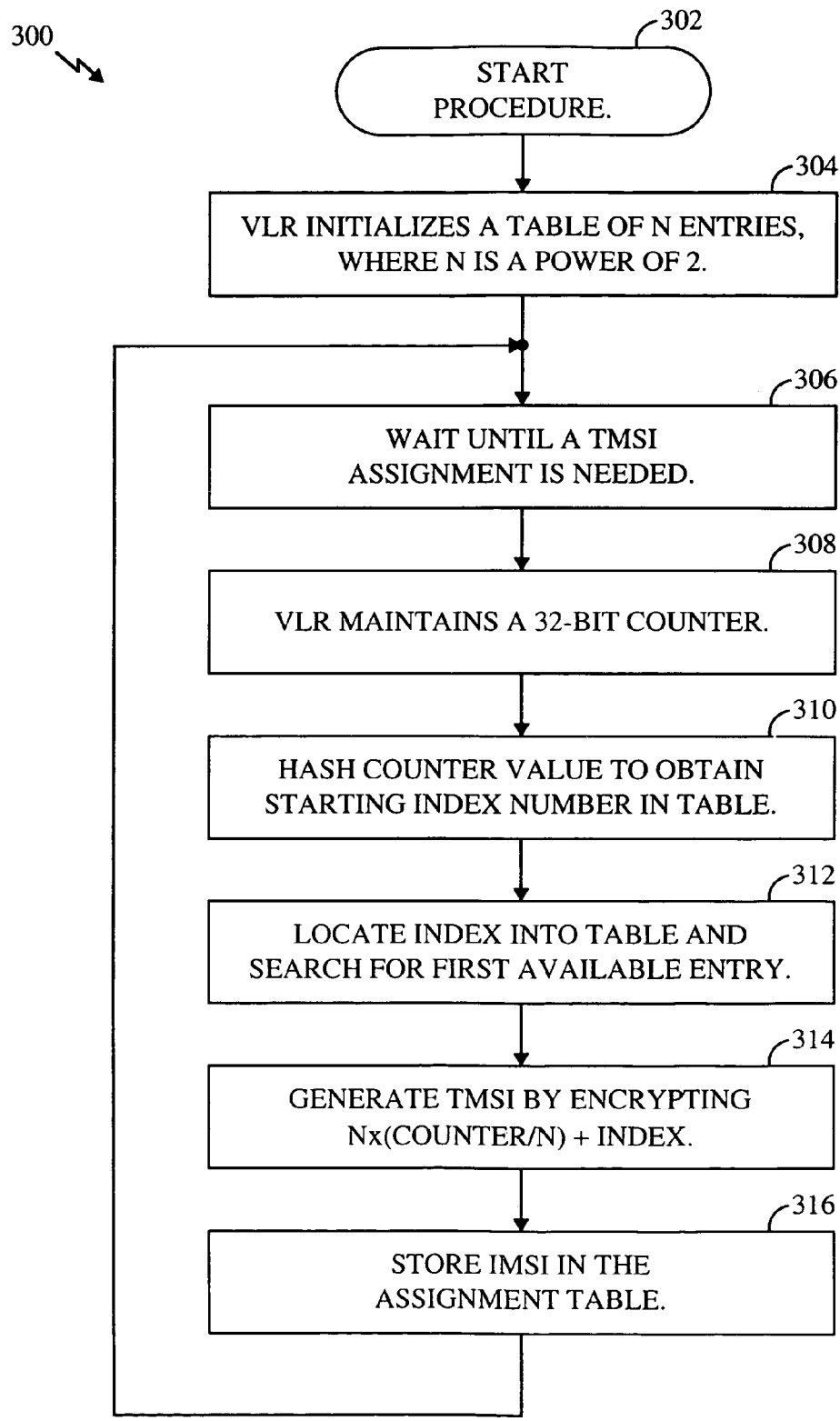
FIG. 3 illustrates an exemplary alternative procedure for generating and maintaining temporary mobile station identifiers according to an embodiment of the present invention.

FIG. 3 illustrates procedure 300, which is an alternative approach for the generation and management of temporary identifiers, such as TMSI for mobile stations. Procedure 300 is particularly useful in cases where the number of entries N is a power of two, wherein service area 100 supports U users. Procedure 300 works for any N value, although the division and modulus operations are particularly efficient for values that are powers of two. In general, procedure 300 resides in a visitor location register, such as VLR 132.

Procedure 300 begins in step 302. In step 304, VLR 132 initializes assignment table 140 to hold N entries. As shown in step 304, N may be chosen such that it is a power of two, however this is exemplary. Assignment table 140 stores an IMSI value for each assigned TMSI value. VLR 132 uses assignment table 140 to obtain the corresponding IMSI value for a TMSI assigned to mobile station 112.

In step 306, VLR 132 waits until a TMSI assignment is needed, such as when mobile station 112 enters a new serving system. In step 308, counter 142 is a K-bit counter, where K bits is the same length as the identifier used by the TMSI. Counter 142 is initialized to zero at the time of installation. Before each new TMSI assignment, counter 142 is incremented. In GSM and CDMA, the TMSI is a thirty two bit number, thus counter 142 is configured to be a thirty two (32) bit counter.

In step 310, counter 142 is hashed to obtain an assignment table index. The hash function generates an assignment table index that ranges from 0 to N−1. A standard hash function similar to the one described in step 210 can be used. The hash function output determines the starting index in assignment table 140, assignment table index.

In step 312, VLR 132 begins searching for an available entry beginning with the entry at assignment table index. If the entry located at the assignment table index has a TMSI assigned to it, then VLR 132 repeats the search at the next entry. For example, it the assignment table index is X, and entry X in the assignment table index has a TMSI assigned to it, then VLR 132 repeats the search at entry X+1 in the assignment table. The search is repeated until an entry that does not have a TMSI assignment is found. As mentioned in the discussion of step 212, the program should also have a provision such that if X+1≧N, the search would resume at index=0 in the table.

In step 314, VLR 132 encrypts the following to generate a TMSI assignment:

$$N \times (Count/N) + Index,$$

where Count is the counter value and Index is the assignment table index generated in step 312, and the multiplication and division operations use standard integer arithmetic. In this case, the decrypted TMSI directly reveals the table index at which the IMSI is stored.

As with procedure 200, VLR 132 uses an encryption algorithm with a K-bit block cipher, where K is the same length of the identifier used by the TMSI. Also, to provide further security, the ciphering key is known only to VLR 132 to hinder an attacker from correctly identifying the next TMSI that is assigned.

In step 316, after VLR 132 generates a TMSI assignment, VLR 132 stores the IMSI of mobile station 112 in assignment table 140. After step 316, the procedure proceeds to step 306 for the next TMSI assignment.

After assignment table 140 is populated with one or more entries using procedure 300, a VLR 132 may obtain the corresponding IMSI of an assigned TMSI, using a similar procedure to one described for procedure 200. When VLR 132 receives a TMSI from mobile station 112, VLR 132 obtains the IMSI of mobile station 112 by first decrypting the TMSI. The decrypted TMSI, modulo N, directly reveals the assignment table index corresponding to mobile station 112. Since entries are not necessarily deleted in the order they are inserted or with a particular spacing between them, a small proportion of the TMSIs may repeat after some number of additional assignments. This, however, is expected in any pseudo-random method of assigning TMSI values and does not affect system security provided that the hash function and the encryption function are well chosen. It is noted that various methods for table management, including methods for entry insertion and deletion are known in the art and can be found, for example, in "The Art of Computer Programming," Vol. 3, by Donald E. Knuth, published in 1998 by Addison-Wesley Publishing Company, with ISBN number 0-201-89685-0.

VLR 132 obtains the corresponding IMSI value of mobile station 112 by referencing the assignment table entry specified by the table index. Generally, VLR 132 stores an additional table, an IMSI-to-TMSI table, in which the TMSI is stored for each active IMSI so that the TMSI can be found for paging. VLR 132 obtains the corresponding TMSI value associated with the IMSI from the IMSI-to-TMSI table. First, VLR 132 decrypts the TMSI of mobile station 112. The decrypted TMSI produces the assignment table index corresponding to mobile station 112. The entry corresponding to mobile station 112 is then removed, thus freeing that TMSI for future use.

Generally, VLR 132 can use a timer to ensure that TMSI values expire after a certain time. This timer should be sufficiently short so that counter 142, which is thirty two (32) bits in one embodiment, does not wrap around to a value that corresponds to an active TMSI assignment.

Thus, in the manner described above, the invention provides methods and systems for efficiently maintaining and securely generating TMSI assignments. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. The software module, also called a computer program in the present application, may contain a number of source code or object code segments and may reside in any computer readable medium such as a RAM memory, flash memory, ROM memory, EPROM memory, EEPROM memory, registers, hard disk, a removable disk, a CD-ROM, a DVD-ROM or any other form of computer readable medium known in the art. An exemplary computer readable medium is coupled to the processor, where the processor can read information from, and write information to, the computer readable medium. In the alternative, the computer readable medium may be integral to the processor. The processor and the computer readable medium may reside in an ASIC. The ASIC may reside in a mobile unit, base station transceiver, or satellite transponder. In the alternative, the processor and the computer readable medium may reside as discrete components in a user terminal.

The above description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for generating a temporary identifier in a service area of a wireless communication system, said method comprising steps of:
    initializing an assignment table;
    maintaining a counter value;
    hashing said counter value to obtain an assignment table index;
    searching said assignment table for an available entry;
    encrypting said counter value to obtain said temporary identifier.

2. The method of claim 1 wherein said service area supports a predetermined number of users.

3. The method of claim 1 wherein said counter value corresponds to a counter of a first predetermined number of bits.

4. The method of claim 3 wherein said encrypting step uses an encryption cipher of a length equal to said first predetermined number of bits.

5. The method of claim 1 further comprising a step of storing a subscriber identifier in said available entry.

6. The method of claim 5 wherein said subscriber identifier is an international mobile subscriber identifier.

7. The method of claim 1 further comprising a step of storing said counter value in said available entry.

8. The method of claim 1 wherein said temporary identifier is a temporary mobile station identifier.

9. The method of claim 1 wherein said searching step begins at said assignment table index.

10. A method for generating a temporary identifier in a service area of a wireless communication system, said method comprising steps of:
    initializing an assignment table;
    maintaining a counter value;
    hashing said counter value to obtain an assignment table index;
    searching said assignment table for an available entry;
    encrypting said counter value and said assignment table index to obtain said temporary identifier.

11. The method of claim 10 wherein said service area supports a predetermined number of users.

12. The method of claim 10 wherein said counter value corresponds to a counter of a first predetermined number of bits.

13. The method of claim 12 wherein said encrypting step uses an encryption cipher of a length equal to said first predetermined number of bits.

14. The method of claim 10 further comprising a step of storing a subscriber identifier in said available entry.

15. The method of claim 14 wherein said subscriber identifier is an international mobile subscriber identifier.

16. The method of claim 10 further comprising a step of storing said counter value in said available entry.

17. The method of claim 10 wherein said temporary identifier is a temporary mobile station identifier.

18. The method of claim 10 wherein said searching step begins at said assignment table index.

19. A wireless communication system comprising:
    means for mobile switching;
    means for registering a visitor location;
    means for storing and assigning a plurality of subscriber identifiers;
    means for maintaining a counter value;
    means for encrypting and generating a temporary identifier.

20. The wireless communication system of claim 19 wherein said means for storing and assigning a plurality of subscriber identifiers farther comprises means for storing a plurality of counter values.

21. The wireless communication system of claim 19 wherein said means for storing and assigning a plurality of subscriber identifiers comprises an international mobile station identifier.

22. The wireless communication system of claim 19 wherein said temporary identifier is a temporary mobile station identifier.

23. The wireless communication system of claim 19 wherein said means for encrypting and generating a temporary identifier encrypts said counter value.

24. The wireless communication system of claim 19 further comprising means for performing a hash function.

25. The wireless communication system of claim 24 wherein said means for performing a hash function is configured to hash said counter value to produce an assignment table index.

26. The wireless communication system of claim 25 wherein said means for encrypting encrypts said assignment table index.

27. A method for generating a temporary identifier in a service area of a wireless communication system, said method comprising steps of:
    initializing an assignment table;
    maintaining a counter value;
    hashing said counter value to obtain an assignment table index;
    searching said assignment table for an available entry;
    encrypting said counter value and said assignment table index to obtain said temporary identifier;
    storing a subscriber identifier and said counter value in said available entry.

28. The method of claim 27 wherein said service area supports a predetermined number of users.

29. The method of claim 27 wherein said counter value corresponds to a counter of a first predetermined number of bits.

30. The method of claim 29 wherein said encrypting step uses an encryption cipher of a length equal to said first predetermined number of bits.

31. The method of claim 27 wherein said temporary identifier is a temporary mobile station identifier.

32. The method of claim 27 wherein said subscriber identifier is an international mobile subscriber identifier.

33. The method of claim 27 wherein said searching step begins at said assignment table index.

34. A computer readable medium including a computer program, said computer program implementing a method for generating a temporary identifier in a service area of a wireless communication system, said computer program comprising:
    a first code segment for initializing an assignment table;
    a second code segment for maintaining a counter value;
    a third code segment for obtaining an assignment table index;
    a fourth code segment for searching said assignment table for an available entry;
    a fifth code segment for encrypting said counter value to obtain said temporary identifier.

35. The computer readable medium of claim 34 wherein said fifth code segment comprises an encryption cipher corresponding to said counter value.

36. The computer readable medium of claim 34 wherein said third code segment comprises a hash function for hashing said counter value to obtain said assignment table index.

37. An apparatus for generating a temporary identifier in a service area of a wireless communication system, the apparatus comprising:
    a visitor location register configured to:
        initialize an assignment table;
        maintain a counter value;
        hash said counter value to obtain an assignment table index;
        search said assignment table for an available entry; and
        encrypt said counter value to obtain said temporary identifier.

38. The apparatus of claim 37, wherein said service area supports a predetermined number of users.

39. The apparatus of claim 37 wherein said counter value corresponds to a counter of a first predetermined number of bits.

40. The apparatus of claim 39 wherein the visitor location register is further configured to encrypt said counter value using an encryption cipher of a length equal to said first predetermined number of bits.

41. The apparatus of claim 37 wherein the visitor location register is further configured to store a subscriber identifier in said available entry.

42. The apparatus of claim 41 wherein said subscriber identifier is an international mobile subscriber identifier.

43. The apparatus of claim 37 wherein the visitor location register is further configured to store said counter value in said available entry.

44. The apparatus of claim 37 wherein said temporary identifier is a temporary mobile station identifier.

45. The apparatus of claim 37 wherein the visitor location register is further configured to search beginning at said assignment table index.

* * * * *